United States Patent [19]
Endo et al.

[11] Patent Number: 5,218,542
[45] Date of Patent: Jun. 8, 1993

[54] CONTROL SYSTEM FOR UNMANNED CARRIER VEHICLE

[75] Inventors: Shinichiro Endo; Junpei Kanazawa; Takami Egawa; Masaaki Toda, all of Ise, Japan

[73] Assignee: Shinko Electric Co., Ltd., Tokyo, Japan

[21] Appl. No.: 678,598

[22] Filed: Apr. 1, 1991

[30] Foreign Application Priority Data

| Mar. 30, 1990 | [JP] | Japan | 2-83717 |
| Mar. 30, 1990 | [JP] | Japan | 2-83720 |
| Apr. 18, 1990 | [JP] | Japan | 2-102245 |
| Apr. 19, 1990 | [JP] | Japan | 2-103789 |

[51] Int. Cl.$^5$ ............................................. G06F 15/50
[52] U.S. Cl. ........................... 364/424.02; 364/424.05; 364/443; 180/169
[58] Field of Search .................. 364/424.02, 424.01, 364/443, 424.05; 180/167–169; 358/103

[56] References Cited

U.S. PATENT DOCUMENTS

| 4,930,084 | 5/1990 | Hosaka et al. | 364/426.04 |
| 4,958,288 | 9/1990 | Takahashi | 364/426.04 |
| 5,036,936 | 8/1991 | Kawano et al. | 180/179 |
| 5,087,969 | 2/1992 | Kamada et al. | 358/103 |

FOREIGN PATENT DOCUMENTS

| 2752167 | 6/1979 | Fed. Rep. of Germany . |
| 3032541 | 5/1982 | Fed. Rep. of Germany . |
| 3820589 | 1/1989 | Fed. Rep. of Germany . |

OTHER PUBLICATIONS

Patent Abstracts of Japan, vol. 013, No. 165, Apr. 20, 1989, of Japanese Patent A-1,003,712.
Proceedings IEEE International Conference Symposium on Intelligent Control, 1987, pp. 94–99.
Electronic Engineering, vol. 61, No. 750, Jun. 1989, pp. 75 and 76 "Fuzzy Logic Processor for Real-Time Control".
Zadeh, "Making Computers Think Like People", Aug. 1984, pp. 26–32, IEEE Spectrum.
Schwartz, "Fuzzy Logic Flowers in Japan", Jul. 1992, pp. 32–35, IEEE Spectrum.

*Primary Examiner*—Thomas G. Black
*Attorney, Agent, or Firm*—Scully, Scott, Murphy & Presser

[57] ABSTRACT

A control system for an unmanned carrier vehicle, capable of automatically and independently traveling along a guiding line laid on a floor, provides a steering angle control unit and/or a velocity control unit. Herein, when the unmanned carrier vehicle is deviated from the guiding line, its deviation is detected. By performing a time-differentiation on the deviation, a deviation direction of the unmanned carrier vehicle is computed. In addition, a steering angle of a steering wheel of the unmanned carrier vehicle is detected by a sensor provided at a wheel of the unmanned carrier vehicle. Based on a result of a fuzzy inference to be performed on the deviation, deviation direction and steering angle, the steering angle control unit controls the steering angle of the unmanned carrier vehicle. Similarly, the velocity control unit controls a traveling velocity of the unmanned carrier vehicle. Incidentally, the fuzzy inference is performed in accordance with the predetermined fuzzy control regulation.

4 Claims, 19 Drawing Sheets (a) LEFTWARD DEVIATION  (b) RIGHTWARD DEVIATION

FIG.10 (MEMBERSHIP FUNCTION OF DEVIATION SIGNAL ΔD)

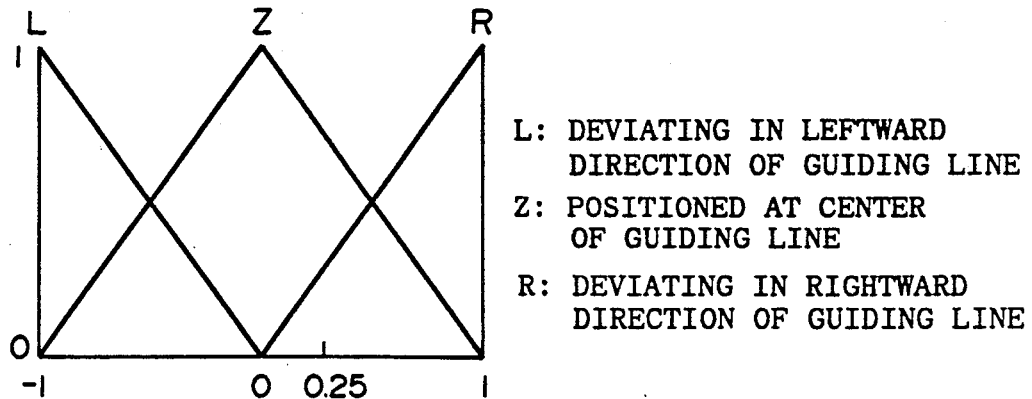

L: DEVIATING IN LEFTWARD DIRECTION OF GUIDING LINE

Z: POSITIONED AT CENTER OF GUIDING LINE

R: DEVIATING IN RIGHTWARD DIRECTION OF GUIDING LINE

FIG.11 (MEMBERSHIP FUNCTION OF TIME-DIFFERENTIATED SIGNAL Δ²D)

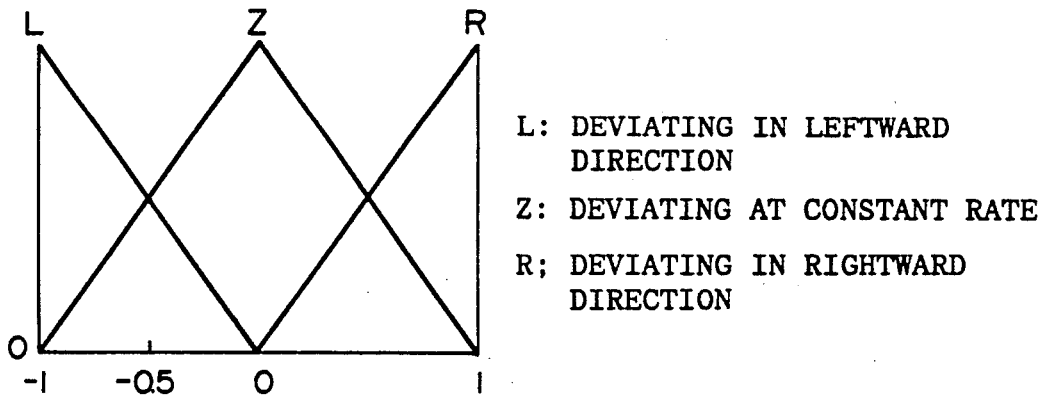

L: DEVIATING IN LEFTWARD DIRECTION

Z: DEVIATING AT CONSTANT RATE

R; DEVIATING IN RIGHTWARD DIRECTION

FIG.12 (MEMBERSHIP FUNCTION OF CURRENT STEERING ANGLE G)

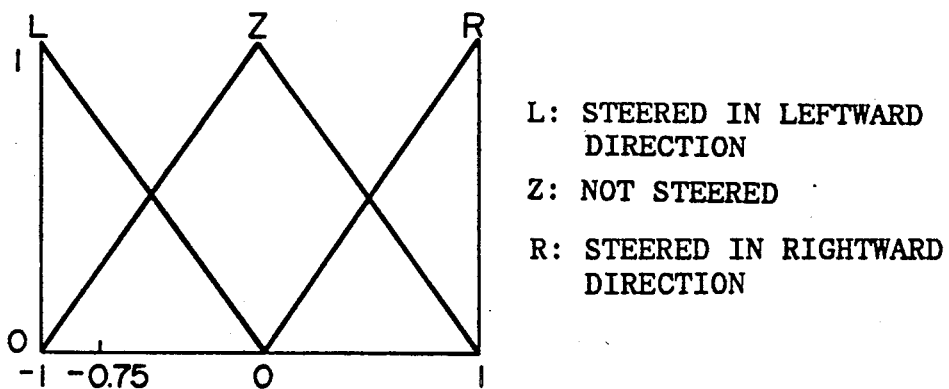

L: STEERED IN LEFTWARD DIRECTION

Z: NOT STEERED

R: STEERED IN RIGHTWARD DIRECTION

FIG.13 (MEMBERSHIP FUNCTION OF STEERING ANGLE CONTROL COMMAND)

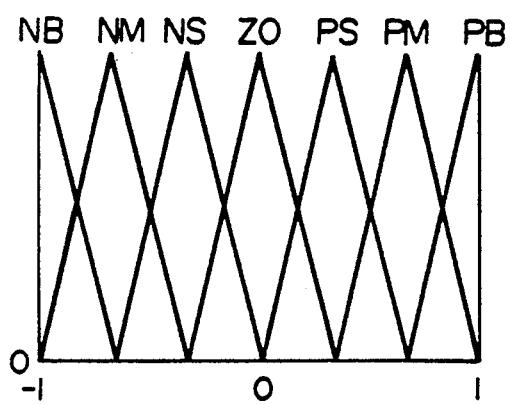

NB: STEERED LARGELY IN LEFTWARD DIRECTION
NM: STEERED IN LEFTWARD DIRECTION
NS: STEERED SMALL IN LEFTWARD DIRECTION
ZO: NOT STEERED
PS: STEERED SMALL IN RIGHTWARD DIRECTION
PM: STEERED IN RIGHTWARD DIRECTION
PB: STEERED LARGELY IN RIGHTWARD DIRECTION

FIG.14 (FUZZY CONTROL REGULATION)

| DEVIATION SIGNAL $\Delta D$ | TIME-DIFFERENTIATED RESULT OF DEVIATION SIGNAL $\Delta^2 D$ | CURRENT STEERING ANGLE G | | |
|---|---|---|---|---|
| | | L | Z | R |
| L | L | PB | PM | PS |
| L | Z | PM | PS | ZO |
| L | R | PS | ZO | NS |
| Z | L | PM | PS | ZO |
| Z | Z | PS | ZO | NS |
| Z | R | ZO | NS | NM |
| R | L | PS | ZO | NS |
| R | Z | ZO | NS | NM |
| R | R | NS | NM | NB |

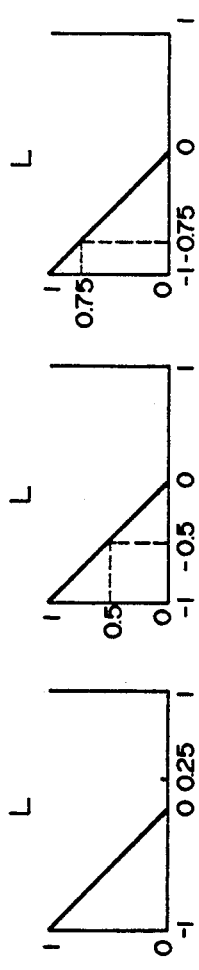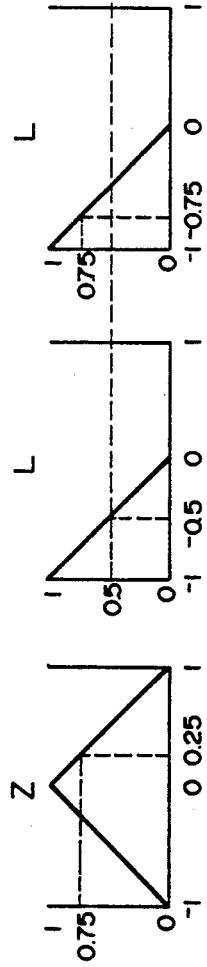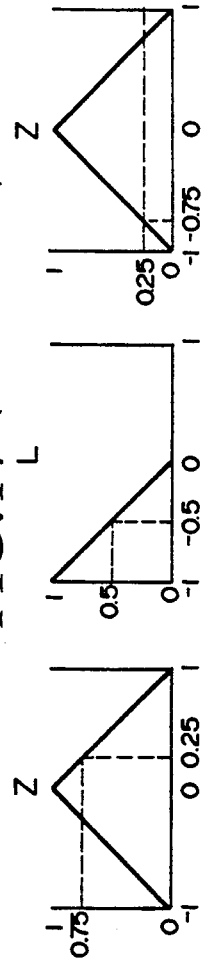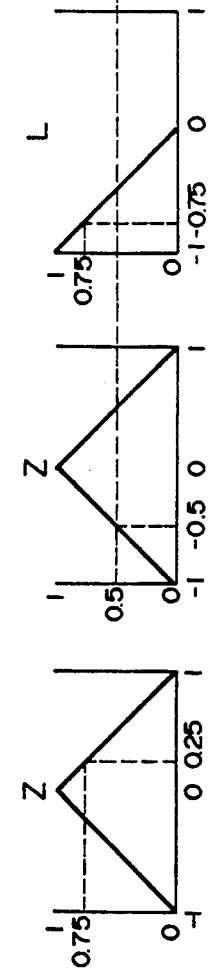
FIG.15 (REGULATION 1)
FIG.16 (REGULATION 10)
FIG.17 (REGULATION 11)
FIG.18 (REGULATION 13)

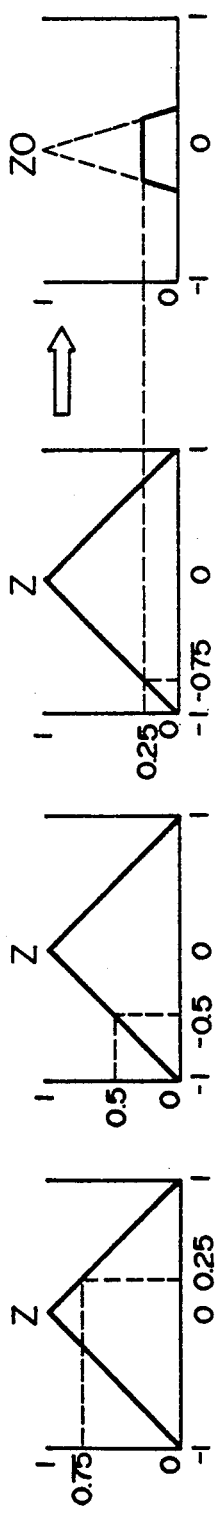
FIG.19 (REGULATION 14)
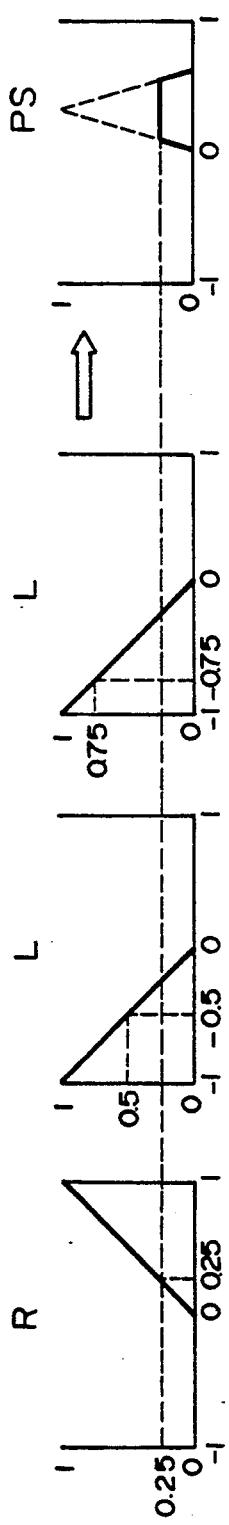
FIG.20 (REGULATION 19)
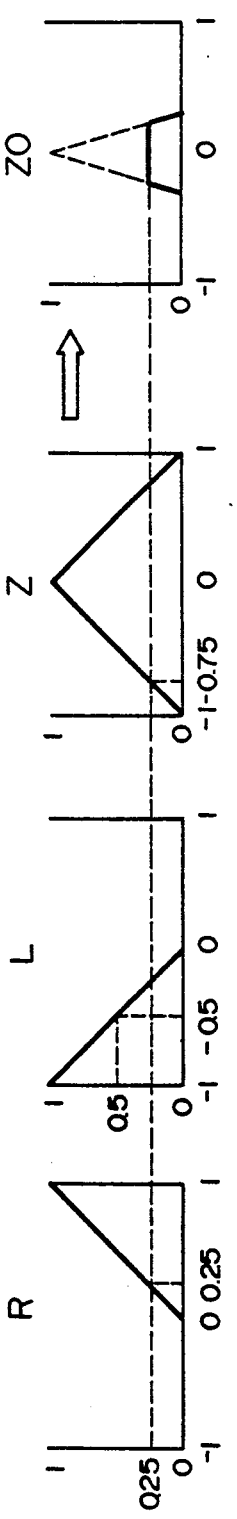
FIG.21 (REGULATION 20)

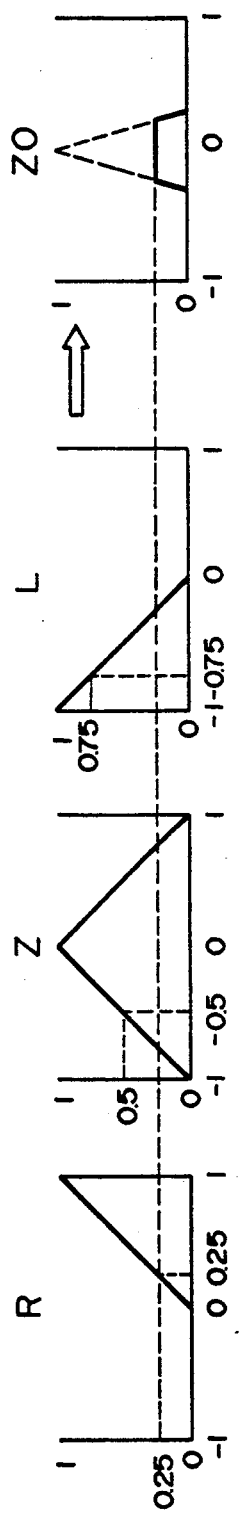
FIG.22 (REGULATION 22)
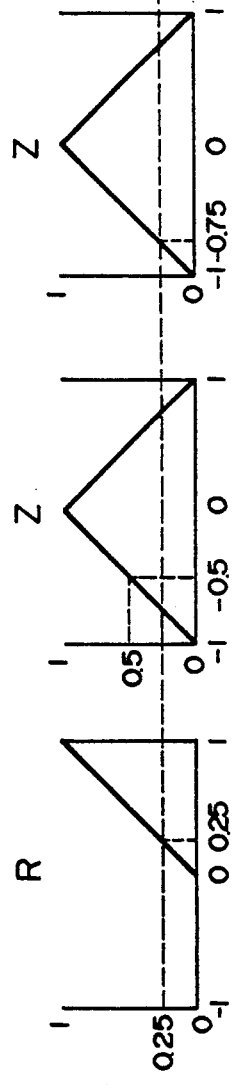
FIG.23 (REGULATION 23)
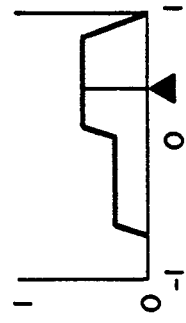
FIG.24

| | INPUT | DIFFERENTIATED SIGNAL $\Delta^2 Ds$ | | |
|---|---|---|---|---|
| INPUT LABEL | LABEL | L | Z | R |
| PROPORTIONAL SIGNAL $\Delta Ds$ | L | N | Z | P |
| | Z | Z | P | Z |
| | R | P | Z | N |

FUZZY CONTROL REGULATION

L: DEVIATING IN LEFTWARD DIRECTION OF GUIDING LINE

Z: POSITIONED AT CENTER OF GUIDING LINE

R: DEVIATING IN RIGHTWARD DIRECTION OF GUIDING LINE

L: DEVIATING IN LEFTWARD DIRECTION

Z: DEVIATING AT CONSTANT RATE

R: DEVIATING IN RIGHTWARD DIRECTION

N: LOW VELOCITY

Z: MIDDLE VELOCITY

P: HIGH VELOCITY

FIG. 28A (EVALUATION OF REGULATION 1)
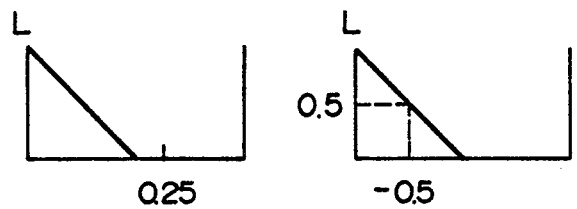
FIG. 28B (EVALUATION OF REGULATION 4)
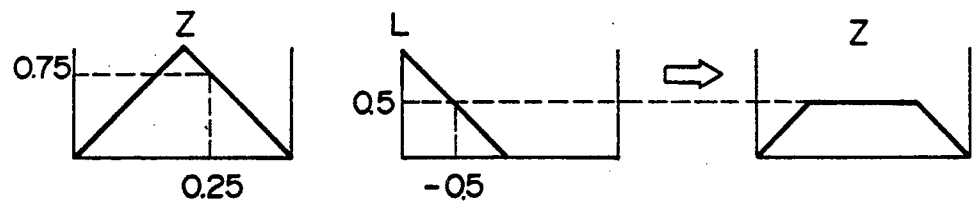
FIG. 28C (EVALUATION OF REGULATION 5)
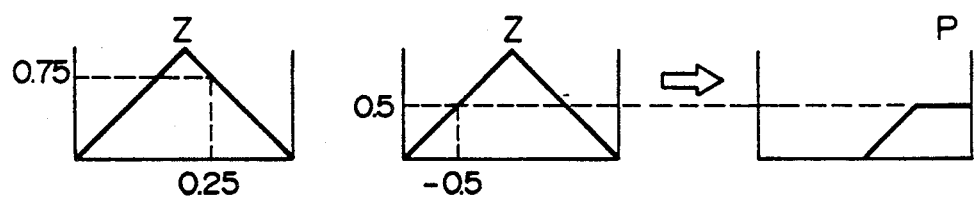
FIG. 28D (EVALUATION OF REGULATION 7)
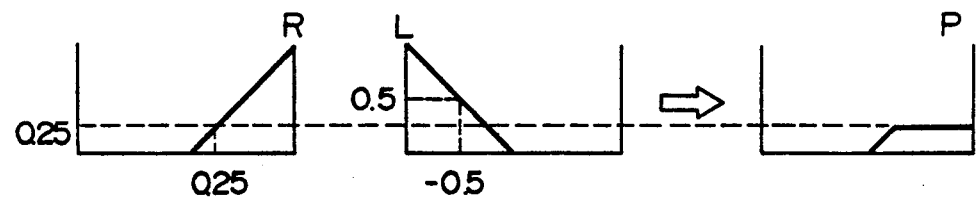
FIG. 28E (EVALUATION OF REGULATION 8)
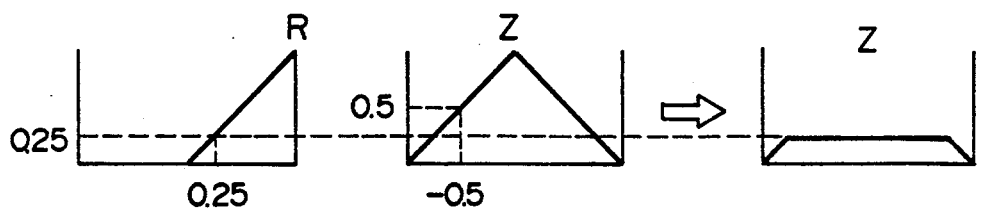

FIG.32 (MEMBERSHIP FUNCTION OF DEVIATION SIGNAL)

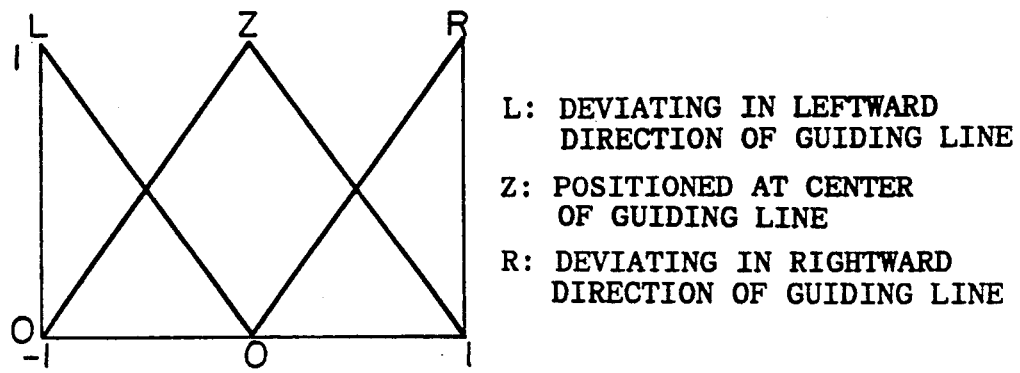

L: DEVIATING IN LEFTWARD DIRECTION OF GUIDING LINE

Z: POSITIONED AT CENTER OF GUIDING LINE

R: DEVIATING IN RIGHTWARD DIRECTION OF GUIDING LINE

FIG.33 (MEMBERSHIP FUNCTION OF TIME-DIFFERENTIATED SIGNAL)

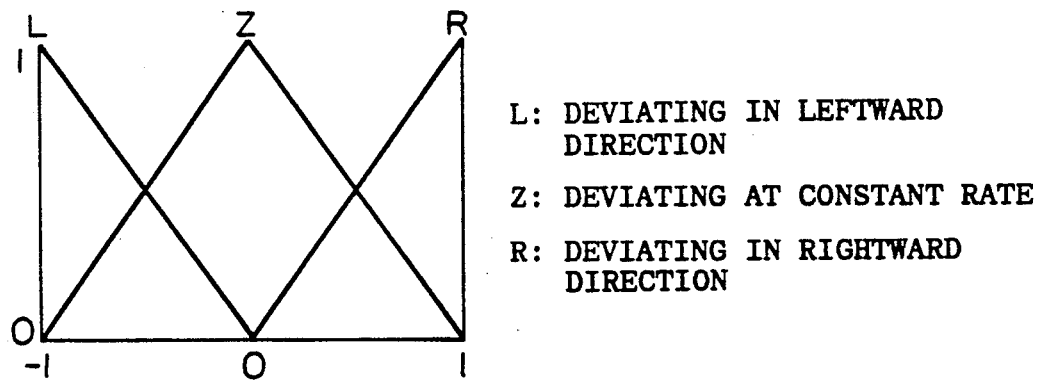

L: DEVIATING IN LEFTWARD DIRECTION

Z: DEVIATING AT CONSTANT RATE

R: DEVIATING IN RIGHTWARD DIRECTION

FIG.34 (MEMBERSHIP FUNCTION OF CURRENT STEERING ANGLE)

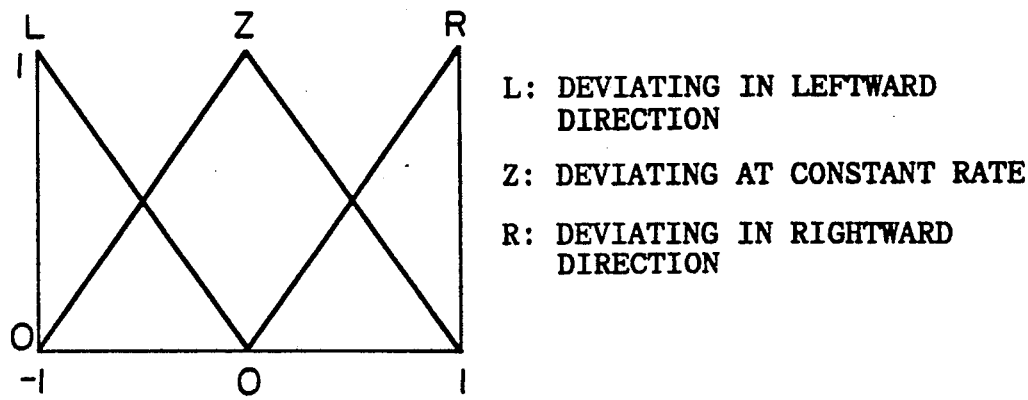

L: DEVIATING IN LEFTWARD DIRECTION

Z: DEVIATING AT CONSTANT RATE

R: DEVIATING IN RIGHTWARD DIRECTION

FIG.35 (MEMBERSHIP FUNCTION OF STEERING ANGLE CONTROL COMMAND)

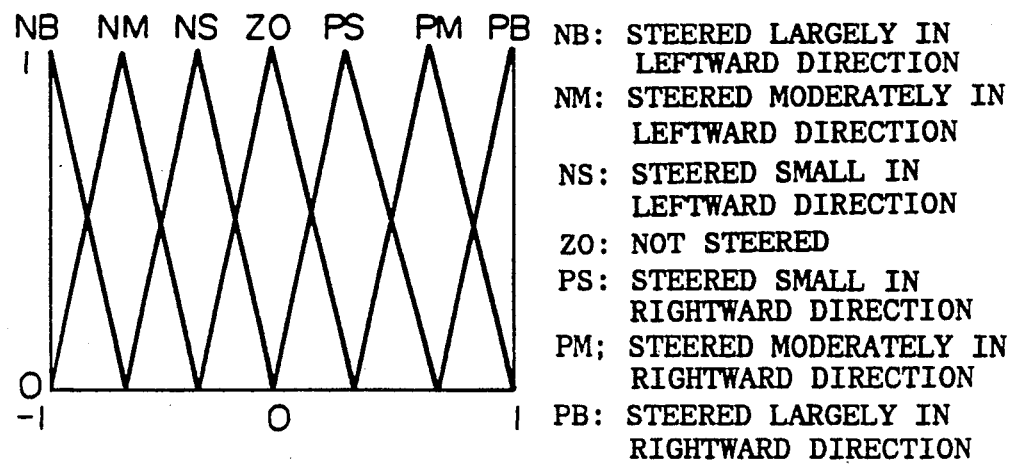

NB: STEERED LARGELY IN LEFTWARD DIRECTION
NM: STEERED MODERATELY IN LEFTWARD DIRECTION
NS: STEERED SMALL IN LEFTWARD DIRECTION
ZO: NOT STEERED
PS: STEERED SMALL IN RIGHTWARD DIRECTION
PM: STEERED MODERATELY IN RIGHTWARD DIRECTION
PB: STEERED LARGELY IN RIGHTWARD DIRECTION

FIG.36 (MEMBERSHIP FUNCTION OF CURRENT VELOCITY)

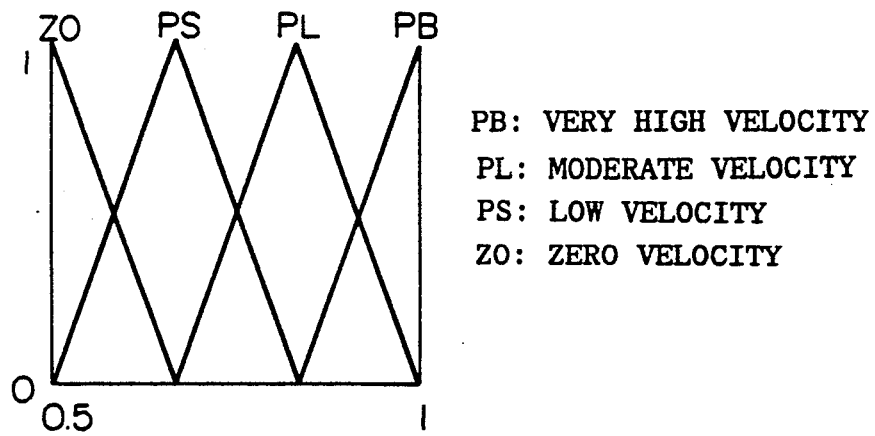

PB: VERY HIGH VELOCITY
PL: MODERATE VELOCITY
PS: LOW VELOCITY
ZO: ZERO VELOCITY

FIG.37 (MEMBERSHIP FUNCTION OF VELOCITY CONTROL COMMAND)

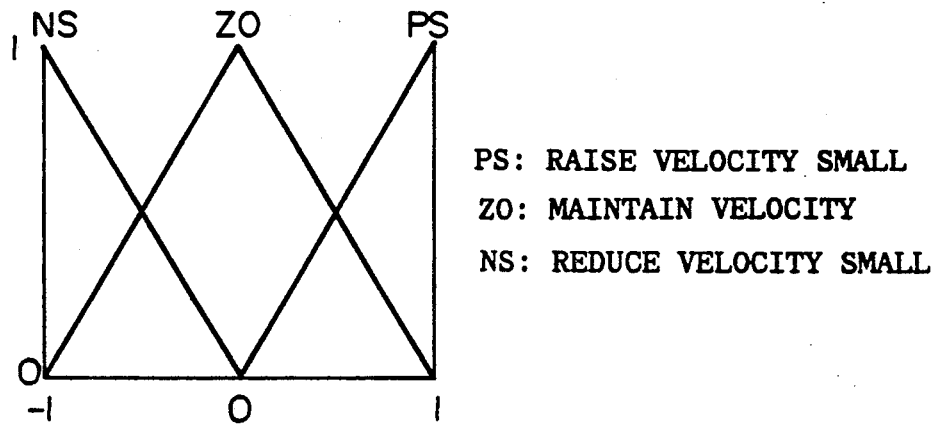

PS: RAISE VELOCITY SMALL
ZO: MAINTAIN VELOCITY
NS: REDUCE VELOCITY SMALL

FIG.38 (FUZZY CONTROL REGULATION)

CURRENT STEERING ANGLE G=L

| DEVIATION SIGNAL ΔD | DIFFERENTIATED SIGNAL Δ²D | ZO | PS | PL | PB |
|---|---|---|---|---|---|
| L | L | ΔU=PB<br>ΔS=– | ΔU=PB<br>ΔS=NS | ΔU=PB<br>ΔS=NS | ΔU=PB<br>ΔS=NS |
| L | Z | ΔU=PM<br>ΔS=– | ΔU=PM<br>ΔS=ZO | ΔU=PM<br>ΔS=NS | ΔU=PM<br>ΔS=NS |
| L | R | ΔU=PS<br>ΔS=– | ΔU=PS<br>ΔS=ZO | ΔU=PS<br>ΔS=ZO | ΔU=PS<br>ΔS=NS |
| N | L | ΔU=PM<br>ΔS=– | ΔU=PM<br>ΔS=ZO | ΔU=PM<br>ΔS=ZO | ΔU=PM<br>ΔS=ZO |
| N | Z | ΔU=PS<br>ΔS=PS | ΔU=PS<br>ΔS=PS | ΔU=PS<br>ΔS=ZO | ΔU=PS<br>ΔS=ZO |
| N | R | ΔU=ZO<br>ΔS=PS | ΔU=ZO<br>ΔS=PS | ΔU=ZO<br>ΔS=PS | ΔU=ZO<br>ΔS= |
| R | L | ΔU=PS<br>ΔS=– | ΔU=PS<br>ΔS=ZO | ΔU=PS<br>ΔS=ZO | ΔU=PS<br>ΔS=NS |
| R | Z | ΔU=ZO<br>ΔS=– | ΔU=ZO<br>ΔS=ZO | ΔU=ZO<br>ΔS=NS | ΔU=ZO<br>ΔS=NS |
| R | R | ΔU=NS<br>ΔS=– | ΔU=NS<br>ΔS=NS | ΔU=NS<br>ΔS=NS | ΔU=NS<br>ΔS=NS |

CURRENT VELOCITY V OF VEHICLE

"–" INDICATES THAT THE PREVIOUS VALUE IS HELD

ΔU: STEERING ANGLE CONTROL COMMAND
ΔS: VELOCITY CONTROL COMMAND

FIG.39  (FUZZY CONTROL REGULATION)

CURRENT STEERING ANGLE G=Z

CURRENT VELOCITY V OF VEHICLE

| DEVIATION SIGNAL ΔD | DIFFERENTIATED SIGNAL Δ2D | ZO | PS | PL | PB |
|---|---|---|---|---|---|
| L | L | ΔU=PM<br>ΔS=- | ΔU=PM<br>ΔS=- | ΔU=PM<br>ΔS=NS | ΔU=PM<br>ΔS=NS |
| L | Z | ΔU=PS<br>ΔS=- | ΔU=PS<br>ΔS=ZO | ΔU=PS<br>ΔS=ZO | ΔU=PS<br>ΔS=NS |
| L | R | ΔU=ZO<br>ΔS=PS | ΔU=ZO<br>ΔS=PS | ΔU=ZO<br>ΔS=PS | ΔU=ZO<br>ΔS=PS |
| Z | L | ΔU=PS<br>ΔS=ZO | ΔU=PS<br>ΔS=ZO | ΔU=PS<br>ΔS=ZO | ΔU=PS<br>ΔS=PS |
| Z | Z | ΔU=ZO<br>ΔS=PS | ΔU=ZO<br>ΔS=PS | ΔU=ZO<br>ΔS=PS | ΔU=ZO<br>ΔS=PS |
| Z | R | ΔU=NS<br>ΔS=- | ΔU=NS<br>ΔS=ZO | ΔU=NS<br>ΔS=ZO | ΔU=NS<br>ΔS=ZO |
| R | L | ΔU=ZO<br>ΔS=PS | ΔU=ZO<br>ΔS=PS | ΔU=ZO<br>ΔS=PS | ΔU=ZO<br>ΔS=PS |
| R | Z | ΔU=NS<br>ΔS=- | ΔU=NS<br>ΔS=ZO | ΔU=NS<br>ΔS=ZO | ΔU=NS<br>ΔS=NS |
| R | R | ΔU=NM<br>ΔS=- | ΔU=NM<br>ΔS=- | ΔU=NM<br>ΔS=NS | ΔU=NM<br>ΔS=NS |

ΔU: STEERING ANGLE CONTROL COMMAND

ΔS: VELOCITY CONTROL COMMAND

FIG. 40 (FUZZY CONTROL REGULATION)

CURRENT STEERING ANGLE G=R

CURRENT VELOCITY V OF VEHICLE

| DEVIATION SIGNAL ΔP | DIFFERENTIATED SIGNAL Δ²D | ZO | PS | PL | PB |
|---|---|---|---|---|---|
| L | L | ΔU=PS<br>ΔS=- | ΔU=PS<br>ΔS=- | ΔU=PS<br>ΔS=ZO | ΔU=PS<br>ΔS=ZO |
| L | Z | ΔU=ZO<br>ΔS=PS | ΔU=ZO<br>ΔS=PS | ΔU=ZO<br>ΔS=PS | ΔU=ZO<br>ΔS=ZO |
| L | R | ΔU=NS<br>ΔS=- | ΔU=NS<br>ΔS=ZO | ΔU=NS<br>ΔS=ZO | ΔU=NS<br>ΔS=NS |
| Z | L | ΔU=ZO<br>ΔS=PS | ΔU=ZO<br>ΔS=PS | ΔU=ZO<br>ΔS=PS | ΔU=ZO<br>ΔS=ZO |
| Z | Z | ΔU=NS<br>ΔS=- | ΔU=NS<br>ΔS=ZO | ΔU=NS<br>ΔS=ZO | ΔU=NS<br>ΔS=NS |
| Z | R | ΔU=NM<br>ΔS=- | ΔU=NM<br>ΔS=ZO | ΔU=NM<br>ΔS=ZO | ΔU=NM<br>ΔS=NS |
| R | L | ΔU=NS<br>ΔS=- | ΔU=NS<br>ΔS=ZO | ΔU=NS<br>ΔS=ZO | ΔU=NS<br>ΔS=NS |
| R | Z | ΔU=NM<br>ΔS=- | ΔU=NM<br>ΔS=ZO | ΔU=NM<br>ΔS=NS | ΔU=NM<br>ΔS=NS |
| R | R | ΔU=NB<br>ΔS=- | ΔU=NB<br>ΔS=NS | ΔU=NB<br>ΔS=NS | ΔU=NB<br>ΔS=NS |

ΔU: STEERING ANGLE CONTROL COMMAND
ΔS: VELOCITY CONTROL COMMAND

CONTROL SYSTEM FOR UNMANNED CARRIER VEHICLE

BACKGROUND OF THE INVENTION

The present invention relates to a control system for an unmanned carrier vehicle, and more particularly to a steering angle control and a velocity control for an unmanned carrier vehicle.

Recently, the developed factory automation (FA) system frequently employs an automatic carrier system using the unmanned carrier vehicle. Normally, this unmanned carrier vehicle is called "automated guided vehicle", i.e., "AGV".

According to the steering angle control for the above-mentioned unmanned carrier vehicle, a sensor equipped in the vehicle detects a deviation from a guiding line (i.e., route cable) laid on its traveling way (e.g., floor), thereby controlling the steering angle such that the detected deviation will be eliminated.

FIGS. 1 and 3 respectively illustrate the same example of unmanned carrier vehicle 1 having three wheels. Herein, FIG. 1 illustrates the vehicle 1 which travels in forward direction, while FIG. 3 illustrates the vehicle 1 which travels in backward direction.

Detection of the deviation of the vehicle, to be traveled in forward direction (hereinafter, simply referred to as "forward travel"), is made by a steering sensor 7a which is directly attached with respect to a steering axis, while detection of the deviation of the vehicle, to be traveled in backward direction (hereinafter, simply referred to as "backward travel"), is made by another steering sensor 7b which is provided in a rear portion of the vehicle. Incidentally, traveling and steering operations in the forward and backward travels are made by a front wheel 2.

In FIG. 1, 3a designates a steering motor which sets the steering angle of the front wheel 2. In addition, 4 designates a traveling motor which drives the front wheel 2, and 5 designates a control box which controls the steering motor 3a based on an output signal of the steering sensor 7a. As shown in FIG. 1, the steering sensor 7a is roughly formed in T-shape, and a base edge portion thereof is attached to a drive shaft of the steering motor 3a. Therefore, the steering sensor 7a is swung in horizontal direction in response to the movement of the drive shaft of the steering motor 3a. In addition, detection coils 8a, 9a are respectively attached to tip edge portions of the steering sensor 7a, so that they can detect a position of a magnetic tape (i.e., guiding line) 11 laid on a traveling way 10. Herein, the detection coil 8a is attached to a right edge portion of the steering sensor 7a in forward direction A, while another detection coil 9a is attached to a left edge portion of the steering sensor 7a. Detection of the guiding line 11 is made by use of the electromotive force to be occurred when the coils 8a, 9a move in the magnetic field of the guiding line 11. As known well, such electromotive force becomes smaller as the distance between the coil and guiding line becomes larger. Incidentally, 12 designate rear wheels which are provided in the rear portion of the vehicle such that they can rotate freely.

FIG. 2 is a block diagram showing a diagramatical configuration of a steering angle control unit which is used for the forward travel of the unmanned carrier vehicle 1. In FIG. 2, the electromotive force to be induced by the detection coils 8a, 9a are amplified in amplifiers 13, 14, which outputs are supplied to a differential amplifier 15. Therefore, the differential amplifier 15 outputs a difference voltage (hereinafter, referred to as "deviation signal") between the output voltages of the amplifiers 13, 14. In the present example, when the steering sensor 7a is deviated from the guiding line 11 in leftward direction (see FIG. 5(a)), the output of the differential amplifier 15 becomes negative. On the other hand, when the steering sensor 7a is deviated from the guiding line 11 in rightward direction (see FIG. 5(b)), the output of the differential amplifier 15 becomes positive. For example, in the case where the steering sensor 7a is deviated from the guiding line 11 in rightward direction and the outputs of the amplifiers 13, 14 are respectively at 4 V, 1 V, the output of the differential amplifier 15 (i.e., deviation signal) is at 3 V. Such deviation signal is supplied to both of a differentiation circuit 16 and a proportional circuit 17. The differentiation circuit 16 performs a time-differentiation (i.e., time derivation) on the deviation signal to thereby detect the deviating direction of the vehicle. Then, outputs of the differentiation circuit 16 and proportional circuit 17 are both supplied to an amplifier 18 wherein they are added together. The addition result of the amplifier 18 may indicate that the vehicle is deviated from the guiding line 11 in leftward direction and it is moving in leftward direction, for example. Such addition result is supplied to a drive circuit 19, by which the steering motor 3a is controlled and the steering angle of the front wheel 2 is varied such that the deviation is corrected.

On the other hand, in the case where the unmanned carrier vehicle 1 is traveled in backward direction, the detection operation is switched from the steering sensor 7a to another steering sensor 7b (see FIG. 3) which is fixed in the rear portion of the vehicle 1, so that as shown in FIG. 4, an adder 20 and an amplifier 21 are added to the circuit shown in FIG. 2. The adder 20 adds an output of the amplifier 21, representing a current steering angle, to the output of the amplifier 18 which is produced based on the electromotive force picked up by detection coils 8b, 9b. Then, the addition result of the adder 20 is supplied to the drive circuit 19. Herein, the current steering angle is detected by a steering angle detector DT attached to the drive shaft of the steering motor 3a. Incidentally, different constants for the differentiation circuit 16 and proportional circuit 17 are set respectively for the forward travel and backward travel.

Meanwhile, the above-mentioned steering angle control unit of the unmanned carrier vehicle 1 suffers from the following drawbacks.

(1) Since the non-linear system is used to detect the deviation from the guiding line 11 and then output a steering angle control command for the front wheel 2, some deviation from the guiding line makes the control of the front wheel 2 impossible or it makes the vehicle to be moved in hunting manner. In order to avoid the above-mentioned uncontrollable event etc., the constants of the differentiation circuit 16 and proportional circuit 17 must be adjusted. However, it takes a long time (e.g., three or four days) to adjust the constants.

(2) Even if the constants of the circuits 16, 17 are adjusted as described above, it is required to re-adjust the constants when condition of a floor 10 or kind (or shape) of the unmanned carrier vehicle 1 is changed.

(3) Due to the un-stable elements existed in the control system, it is impossible to raise the traveling velocity of the vehicle.

(4) It is required to partially change the constants of the circuits 16, 17 and circuit configuration in accordance with the forward travel and backward travel respectively, which raises the whole cost of the system.

Meanwhile, FIG. 6 is a block diagram showing a velocity control unit used for the vehicle 1. In FIG. 6, a multiplier 23 multiplies a steering angle signal Sa by a reference velocity signal Vref. Herein, the steering angle signal Sa is outputted from an encoder (not shown) which detects the steering angle of the steering motor 3a. Herein, the polarity of the signal Sa turns to negative when the vehicle is steered in leftward direction, while it turns to positive when the vehicle is steered in rightward direction. In addition, 24 designates a velocity generator which generates a velocity feedback signal Vf having a level corresponding to the number of revolutions of a traveling motor 3b. Further, a control circuit 25 receives the output of the multiplier 23 and velocity feedback signal Vf, thereby outputting a velocity command signal Sc to the traveling motor 3b. FIG. 7 shows an example of the control characteristics of the control circuit 25. In the graph shown in FIG. 7, vertical axis represents the foregoing velocity command signal Sc, while horizontal axis represents the steering angle. As shown in this graph, the unmanned carrier vehicle 1 travels at the reference velocity (e.g., 4 km/h) while the steering angle lies in the range of $\pm \theta$. On the other hand, when the steering angle becomes larger than the steering angle $+\theta$ or becomes lower than $-\theta$, the vehicle 1 travels at a velocity which is inversely proportional to the steering angle. In short, as the angle by which the vehicle 1 is steered becomes larger, the traveling velocity of the vehicle 1 becomes slower.

When considering the case of the manned vehicle which is driven by the person, the person, who drives the vehicle based on his experiences, decelerates the traveling velocity of the vehicle at first when entering into the curved way, and maintains the traveling velocity at constant while traveling through the curved way, and then accelerates the traveling velocity when the curved way has been almost passed away, by which it is possible to manually carry out the smooth velocity control for the manned vehicle.

However, the unmanned vehicle is designed to carry out the velocity control in response to the steering angle. Therefore, there is a drawback in that the unmanned vehicle cannot carry out the smooth velocity control which can be made by the person. In addition, when entering the curved way having a relatively small turning radius, there is a possibility in that the unmanned vehicle cannot decelerate the traveling velocity sufficiently and therefore it cannot travel the curved way well.

FIG. 8 shows another velocity control unit for the unmanned carrier vehicle. As comparing to the foregoing velocity control unit shown in FIG. 6, the velocity control unit shown in FIG. 8 is characterized by providing a switching circuit 26 which can selectively set one of the predetermined four velocities as the reference velocity in accordance with velocity information. Herein, the velocity information is read from a mark (not shown) located at a position near the guiding line on the traveling way by a mark detector (not shown) attached to the vehicle 1. Then, the reference velocity selected by the switching circuit 26 is supplied to the control circuit 25.

Since the unmanned carrier vehicle 1 requires both of the steering angle control unit and velocity control unit, there is a problem in that the circuit configuration must be complicated. In addition, the unmanned carrier vehicle 1 is designed to travel the curved way at constant velocity which is determined in response to the steering angle control required for the sharpest portion of the curved way, so that there is another problem in that the traveling efficiency cannot be raised.

SUMMARY OF THE INVENTION

It is accordingly an object of the present invention to provide a control system for an unmanned carrier vehicle by which the steering angle and traveling velocity can be controlled well such that the vehicle can smoothly travel the curved way.

In a first aspect of the present invention, there is provided a steering angle control unit for an unmanned carrier vehicle capable of automatically traveling along a guiding line laid on a floor by itself, wherein the steering angle control unit comprising:

detection means for detecting a deviation of the unmanned carrier vehicle to be deviated from the guiding line, thereby outputting a deviation signal;

computation means for performing a time-differentiation on the deviation signal to thereby compute a deviation direction of the unmanned carrier vehicle;

steering angle detecting means for detecting a steering angle of a wheel of the unmanned carrier vehicle; and control means for performing a fuzzy inference on the deviation, the deviation direction and the steering angle at a current timing, thereby controlling the steering angle of the wheel of the unmanned carrier vehicle based on a result of the fuzzy inference.

In a second aspect of the present invention, there is provided a velocity control unit for an unmanned carrier vehicle capable of automatically traveling along a guiding line laid on a floor by itself, wherein the velocity control unit comprising:

control signal generating means for generating a first control signal which value is proportional to a positional deviation of the unmanned carrier vehicle to be deviated from the guiding line, and also generating a second control signal which is obtained by performing a time-differentiation on the positional deviation; and control means, responsive to the first and second control signals, for performing a fuzzy inference on a fuzzy set defined by a plurality of membership functions in accordance with a predetermined fuzzy control regulation, thereby controlling a traveling velocity of the unmanned carrier vehicle based on a result of the fuzzy inference.

In a third aspect of the present invention, there is provided a velocity control unit for an unmanned carrier vehicle capable of automatically traveling along a guiding line laid on a floor by itself, wherein the velocity control unit comprising:

control signal generating means for generating a first control signal which value is proportional to a steering angle by which the unmanned carrier vehicle is steered along the guiding line, and also generating a second control signal which is obtained by performing a time-differentiation on the steering angle; and control means, responsive to the first and second control signals, for performing a fuzzy inference on a fuzzy set defined by a plurality of membership functions in accordance with a predetermined fuzzy control regulation, thereby controlling a traveling velocity of the unmanned carrier vehicle based on a result of the fuzzy inference.

In a fourth aspect of the present invention, there is provided a control unit for an unmanned carrier vehicle capable of automatically traveling along a guiding line laid on a floor by itself, wherein the control unit comprising:

detection means for detecting a deviation of the unmanned carrier vehicle to be deviated from the guiding line, thereby outputting a deviation signal;

computation means for performing a time-differentiation on the deviation signal to thereby compute a deviation direction of the unmanned carrier vehicle;

steering angle detecting means for detecting a steering angle of a wheel of the unmanned carrier vehicle;

traveling velocity detecting means for detecting a traveling velocity of the unmanned carrier vehicle; and control means for performing a fuzzy inference on the deviation, the deviation direction and the steering angle at a current timing, thereby controlling the steering angle and the traveling velocity based on a result of the fuzzy inference.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIGS. 10 to 13 are graphs each showing a different membership function used in the first embodiment;

FIG. 14 shows a relationship among three fuzzy control elements used in a fuzzy control to be performed in the first embodiment;

FIGS. 15 to 24 show graphs which are used to explain a computation to be made in the fuzzy control in the first embodiment;

FIGS. 28A-28E and 29 are graphs used to explain the fuzzy inference to be performed in the second embodiment;

FIGS. 32 to 37 are graphs each showing membership functions to be executed in the third embodiment; and FIGS. 38 to 40 show fuzzy control regulations to be performed in the third embodiment with respect to the current steering angle.

DESCRIPTION OF THE PREFERRED EMBODIMENTS

Next, description will be given with respect to the preferred embodiments of the present invention.

[A] FIRST EMBODIMENT

Figure 2:
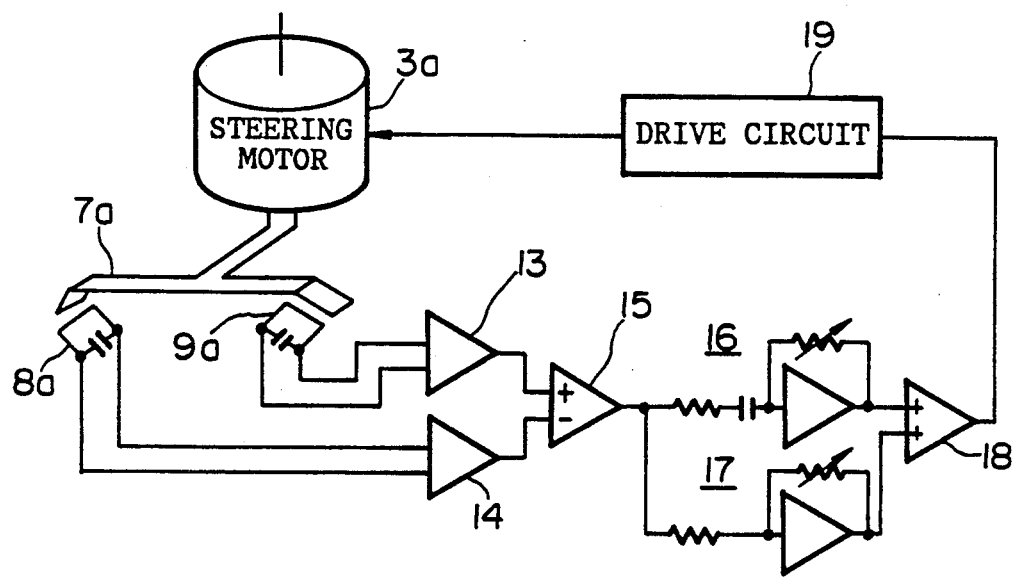
FIGS 2 and 4 are block diagrams respectively showing different electric configurations of an steering angle control unit used for the unmanned carrier vehicle.
Figure 3:
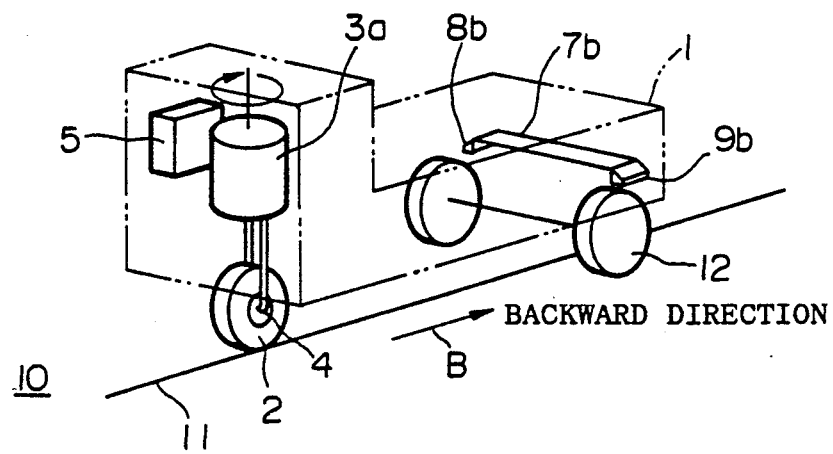
Figure 4:
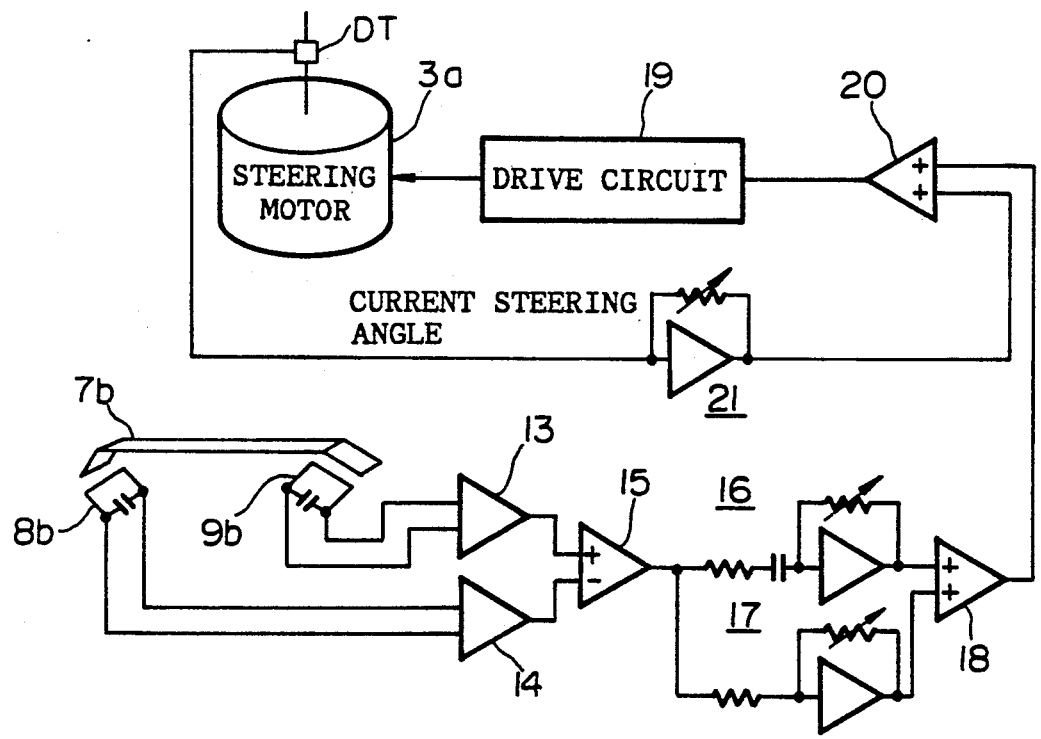
Figure 5:
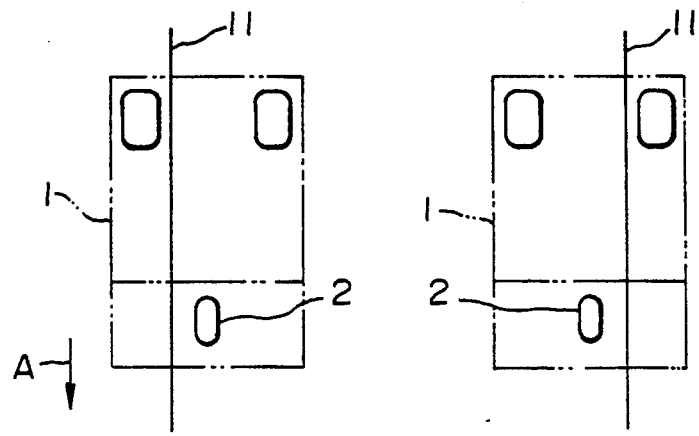
FIGS. 5(a), 5(b) are plan views of the vehicle used for explaining the deviation manner of the vehicle with respect to the guiding line.
Figure 6:
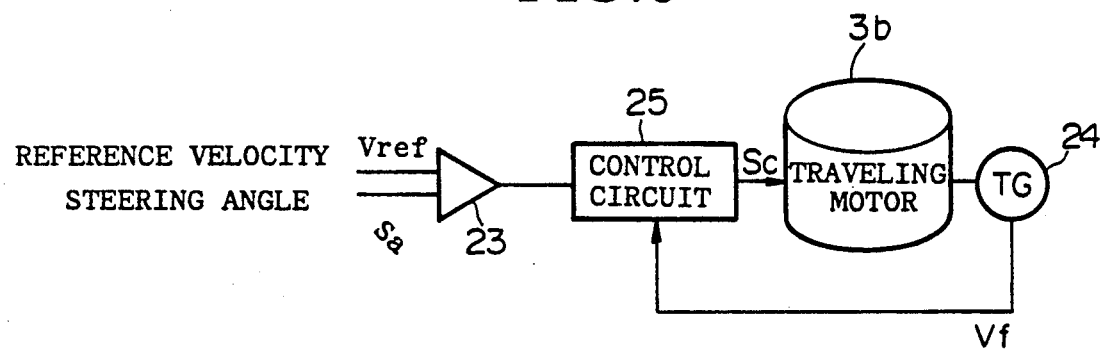
FIG. 6 is a block diagram showing different configurations of a velocity control unit used for the vehicle.
Figure 7:
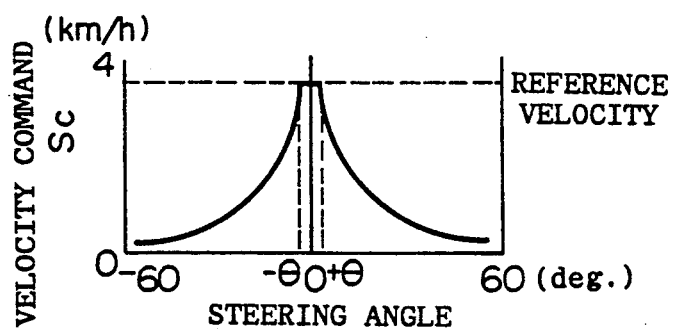
FIG. 7 is a graph showing the control characteristics of the velocity control unit.
Figure 8:
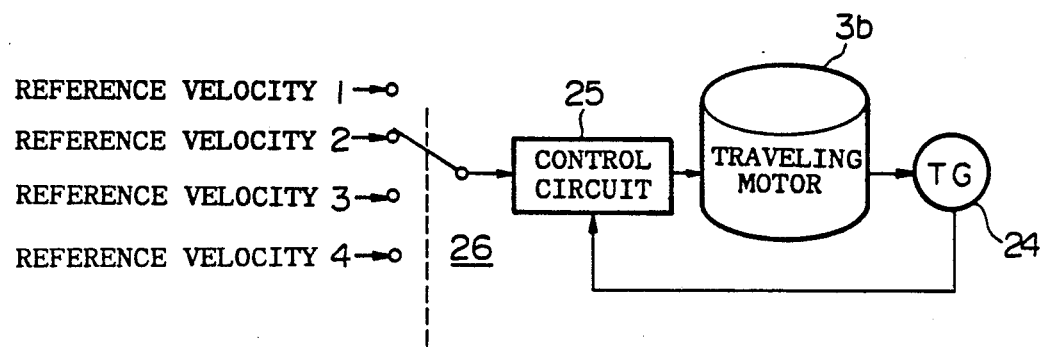
FIG. 8 is a block diagram showing another example of the velocity control unit.
Figure 9:
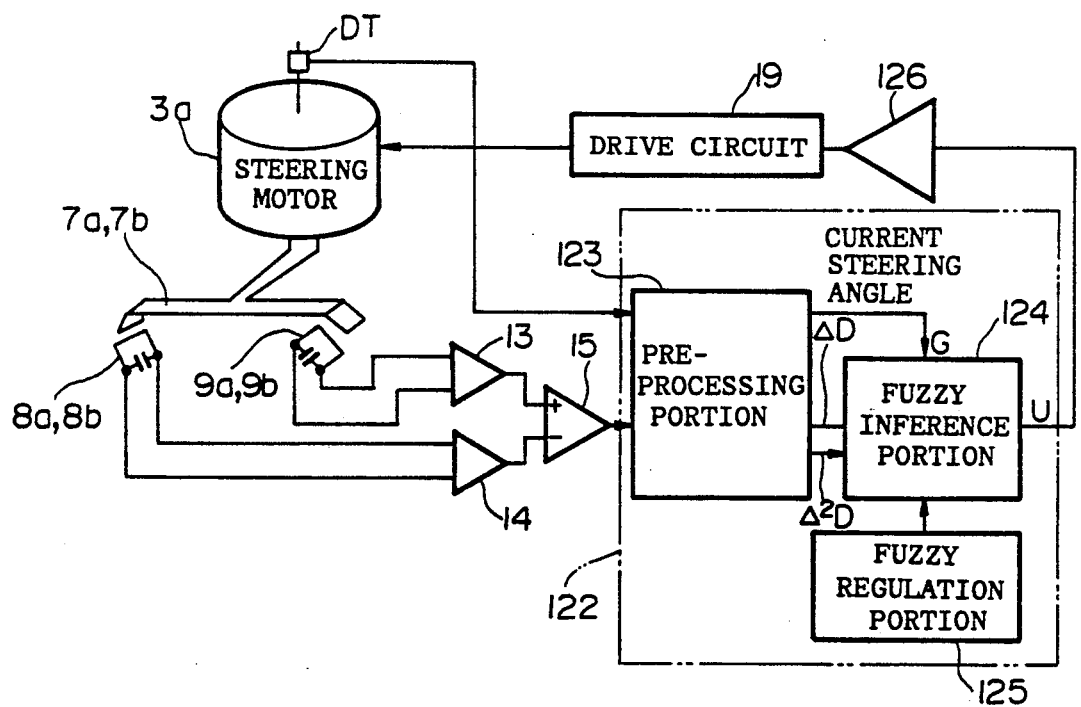
FIG. 9 is a block diagram showing a diagramatical electric configuration of a steering angle control unit used for the unmanned carrier vehicle according to a first embodiment of the present invention.

FIG. 9 is a block diagram showing a diagramatical configuration of a steering angle control unit for the unmanned carrier vehicle according to a first embodiment of the present invention, wherein parts identical to those shown in FIGS. 2, 4 are designated by the same numerals.

In this embodiment shown in FIG. 9, the foregoing differentiation circuit 16 and proportional circuit 17 are replaced by a fuzzy logic controller 122 etc. As described before, the steering sensors 7a, 7b are switched responsive to the forward travel and backward travel of the vehicle 1 respectively.

The fuzzy logic controller 122 contains a pre-processing portion 123, a fuzzy inference portion 124 and a fuzzy regulation portion 125. Based on the output of the foregoing differential amplifier 15, the pre-processing portion 123 outputs a deviation signal $\Delta D$ representing the deviation of the vehicle from the guiding line 11. In addition, the pre-processing portion 123 also outputs a time-differentiated value $\Delta^2 D$ which is obtained by performing the time-differentiation on the deviation signal $\Delta D$. Both of $\Delta D$, $\Delta^2 D$ are supplied to the fuzzy inference portion 124. Further, the pre-processing portion 123 supplies a signal representing a current steering angle G of the steering motor 3a to the fuzzy inference portion 124. Based on the signals $\Delta D$, $\Delta^2 D$ and the steering angle G which is detected by the steering angle detector DT, the fuzzy inference portion 124 performs a fuzzy inference to thereby compute a steering angle control command U. In this case, so-called "Method of MAX-MIN Logical Product" is employed as the inference method to be performed in the fuzzy inference portion 124, while so-called "Method of Center-of-Mass" is employed as a method how to define the output. Both methods are well known in the field of the fuzzy logic control.

The steering angle control command U outputted from the fuzzy inference portion 124 is supplied to an amplifier 126 wherein it is amplified and then supplied to the drive circuit 19.

Next, detailed description will be given with respect to the computation process of the steering angle control command U to be computed in the fuzzy inference portion 124.

FIG. 10 shows a membership function of the deviation signal $\Delta D$, while FIG. 11 shows a membership function of the time-differentiated signal $\Delta^2 D$. In addition, FIG. 12 shows a membership function of the current steering angle G, while FIG. 13 shows a membership function of the steering angle control command. In FIGS. 10 to 13, for the simplification, upper and lower limit values are set at ±1 respectively. Herein, numerals L, Z, R, NB, NM, NS, ZO, PS, PM, PB indicate labels of the membership function. Further, the triangular-wave function is employed as the membership function. In the present embodiment, the following meanings are respectively assigned to the labels of the membership function.

① Membership Function of Deviation Signal $\Delta D$ (see FIG. 10)

Figure 1:
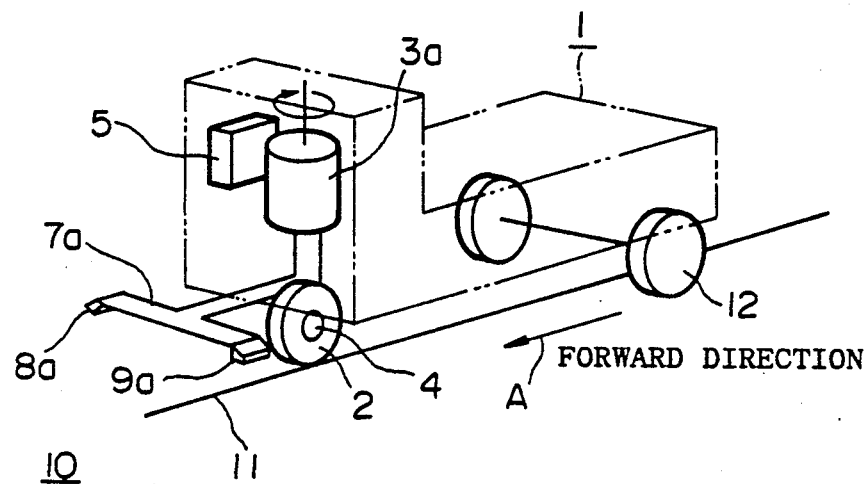
FIGS. 1 and 3 are perspective side views respectively illustrating inner mechanisms of an unmanned carrier vehicle.

L: deviating in leftward direction of the guiding line 11 (see FIG. 1)

Z: roughly positioned at center of the guiding line 11

R: deviating in rightward direction of the guiding line 11

② Membership Function of Time-Differentiated Signal $\Delta^2 D$ (see FIG. 11)

L: deviating in leftward direction

Z: deviating at constant rate

R: deviating in rightward direction

③ Membership Function of Current Steering Angle G (see FIG. 12)

L: steered in leftward direction

Z: not steered

R: steered in rightward direction

④ Membership Function of Steering Angle Control Command (see FIG. 13)

NB: steered largely in leftward direction

NM: steered in leftward direction

NS: steered small in leftward direction

ZO: not steered

PS: steered small in rightward direction

PM: steered in rightward direction

PB: steered largely in rightward direction

Next, description will be given with respect to fuzzy control regulations by referring to FIG. 14. FIG. 14 shows a relationship between the deviation signal $\Delta D$, its time-differentiated signal $\Delta^2 D$ and the current steering angle G. There are provided twenty-seven fuzzy control regulations, wherein regulation 1 corresponds to "L, L, L", regulation 2 corresponds to "L, L, Z", regulation 3 corresponds to "L, L, R", regulation 4 corresponds to "L, Z, L", ..., regulation 8 corresponds to "L, R, Z", ..., regulation 16 corresponds to "Z, R, L", ..., regulation 27 corresponds to "R, R, R". For example, in case of regulation 6 where the deviation signal $\Delta D$ is at "L", its time-differentiated signal $\Delta^2 D$ is at "Z" and the steering angle G is at "R", the steering angle control command $\Delta U$ is set at "ZO". In other words, when the vehicle 1 is deviated from the guiding line 11 in leftward direction, the time-differentiated value of the deviation (i.e., direction change of the front wheel 2) is at zero level and the front wheel 2 is steered right, it is controlled that the steering operation of the front wheel 2 is set at zero level. Similarly, other regulations are performed.

Meanwhile, the fuzzy inference portion 124 evaluates the deviation signal $\Delta D$, its time-differentiated signal $\Delta^2 D$ and current steering angle G by each fuzzy control regulation.

Now, description will be given with respect to an example of the above-mentioned values which are set as $\Delta D = 0.25$, $\Delta^2 D = -0.5$, $G = -0.75$. Herein, it is judged whether or not each regulation conforms to this example. Incidentally, in each regulation as shown in FIGS. 15 to 23, the conformity rate is obtained from each graph wherein its horizontal axis represents each of the above-mentioned values and vertical axis represents the corresponding conformity rate.

According to regulation 1 shown in FIG. 15, the conformity rate "0" is obtained with respect to the deviation signal $\Delta D$, conformity rate "0.5" is obtained with respect to the time-differentiated signal $\Delta^2 D$ and conformity rate "0.75" is obtained with respect to the current steering angle G. In regulation 1, the minimum among the conformity rates is "0", which indicates that regulation 1 does not conform to the present example. Similarly, the present example does not conform to the regulation, such as regulations 2 to 9, where the conformity rate of the deviation signal $\Delta D$ is at "0".

In regulation 10 as shown in FIG. 16, the conformity rate is at "0.75" for the deviation signal $\Delta D$, "0.5" for the time-differentiated signal $\Delta^2 D$, and "0.75" for the current steering angle G. The minimum of them is "0.5". Therefore, as shown in the rightmost graph of FIG. 16, the height of the membership function PM of the steering angle control command is limited to "0.5".

In regulation 11 as shown in FIG. 17, the conformity rate is at "0.75" for the deviation signal $\Delta D$, "0.5" for the time-differentiated signal $\Delta^2 D$, and "0.25" for the current steering angle G. The minimum (MIN) of them is at "0.25". Therefore, as shown in rightmost graph of FIG. 17, the height of the membership function PS of the steering angle control command is limited to "0.25".

In regulation 12, the conformity rate for the current steering angle G is at "0". Therefore, regulation 12 does not conform to the present example.

In regulation 13 as shown in FIG. 18, the conformity rate is at "0.75" for the deviation signal $\Delta D$, "0.5" for the time-differentiated signal $\Delta^2 D$, and "0.75" for the current steering angle G. Herein, MIN is at "0.5", so that as shown in the rightmost graph of FIG. 18, the height of the membership function PS of the steering angle control command is limited to "0.5".

In regulation 14 as shown in FIG. 19, the conformity rate is at "0.75" for the deviation signal $\Delta D$, "0.5" for the time-differentiated signal $\Delta^2 D$, and "0.25" for the current steering angle G. Herein, MIN is at "0.25", so that as shown in the rightmost graph of FIG. 19, the height of the membership function ZO of the steering angle control command is limited to "0.25".

In regulation 15, the conformity rate for the current steering angle G is at "0". Therefore, regulation 15 does not conform to the present example.

In regulations 16 to 18, the conformity rate for the time-differentiated signal $\Delta^2 D$ is at "0". Therefore, these regulations do not conform to the present example.

In regulation 19 as shown in FIG. 20, the conformity rate is at "0.25" for the deviation signal $\Delta D$, "0.5" for the time-differentiated signal $\Delta^2 D$, and "0.75" for the current steering angle G. Herein, MIN is at "0.25", so that as shown in the rightmost graph of FIG. 20, the height of the membership function PS of the steering angle control command is limited to "0.25".

In regulation 20 as shown in FIG. 21, the conformity rate is at "0.25" for the deviation signal $\Delta D$, "0.5" for the time-differentiated signal $\Delta^2 D$, and "0.25" for the current steering angle G. Herein, MIN is at "0.25", so that as shown in the rightmost graph of FIG. 21, the height of the membership function ZO of the steering angle control command is limited to "0.25".

In regulation 21, the conformity rate for the current steering angle G is at "0". Therefore, regulation 21 does not conform to the present example.

In regulation 22 as shown in FIG. 22, the conformity rate is at "0.25" for the deviation signal $\Delta D$, "0.5" for the time-differentiated signal $\Delta^2 D$, and "0.75" for the current steering angle G. Herein, MIN is at "0.25", so that as shown in the rightmost graph of FIG. 22, the height of the membership function ZO of the steering angle control command is limited to "0.25".

In regulation 23 as shown in FIG. 23, the conformity rate is at "0.25" for the deviation signal $\Delta D$, "0.5" for the time-differentiated signal $\Delta^2 D$, and "0.25" for the current steering angle G. Herein, MIN is at "0.25", so that as shown in the rightmost graph of FIG. 23, the height of the membership function NS of the steering angle control command is limited to "0.25".

In regulation 24, the conformity rate for the current steering angle G is at "0". Therefore, regulation 24 does not conform to the present example.

Similarly, in regulations 25, 26, the conformity rate for the time-differentiated signal $\Delta^2 D$ is at "0", so that these regulations do not conform to the present example. Further, in regulation 27, both of the conformity rates for the time-differentiated signal $\Delta^2 D$ and current steering angle G are at "0", therefore, regulation 27 does not conform to the present example.

Thereafter, the fuzzy inference portion 124 performs the maximum (MAX) composition on the graphs which are obtained by the above-mentioned computations, thereby forming a figure as shown in FIG. 24. Then, the center-of-mass (see ▲) is computed from this figure, and then the computed center-of-mass is outputted as the steering angle control command U. In the present example, according to the steering angle control command U, the front wheel 2 is steered small in rightward direction.

The above-mentioned steering angle control command U is supplied to the amplifier 126 wherein it is amplified and then supplied to the drive circuit 19. In response to the steering angle control command U, the drive circuit 19 drives the steering motor 3 to thereby change the steering angle of the front wheel 2.

In the present embodiment, "Method of MAX-MIN Logical Product" is employed as the fuzzy inference method, while "Method of Center-of-Mass" is employed as the method how to define the output. However, it is possible to use other methods.

As described heretofore, in the steering angle control unit of the unmanned carrier vehicle according to the first embodiment of the present invention, the fuzzy inference is performed on the deviation from the guiding line, its time-differentiated value and current steering angle, and then the steering angle of the front wheel is controlled based on the result of the fuzzy inference. Therefore, as comparing to the conventional steering angle control unit including the non-linear element, the present embodiment has the following effects.

① The conventional system suffers from the uncontrollable event to be occurred for the steering angle control of the wheel or the hunting event in some deviation of the vehicle to be deviated from the guiding line. However, as described before, there is no possibility in that such events occurs in the present system.

② It is possible to reduce the adjusting time.

③ The present system is not affected by the floor condition, kind of the unmanned carrier vehicles (each having the different shape) and the size of the load to be carried by each vehicle, so that the vehicle can carry out the smooth travel.

④ It is possible to raise the traveling velocity of the vehicle.

⑤ There is no need to change the constants or partially change the circuit configuration in each of the forward travel and backward travel, by which it is possible to reduce the cost of the system.

[B] SECOND EMBODIMENT

Next, description will be given with respect to a velocity control unit for the unmanned carrier vehicle according to a second embodiment of the present invention by referring to FIGS. 25 to 29, wherein parts identical to those as shown in the foregoing drawings are designated by the same numerals, hence, detailed description thereof will be omitted.

Figures 25, 27:
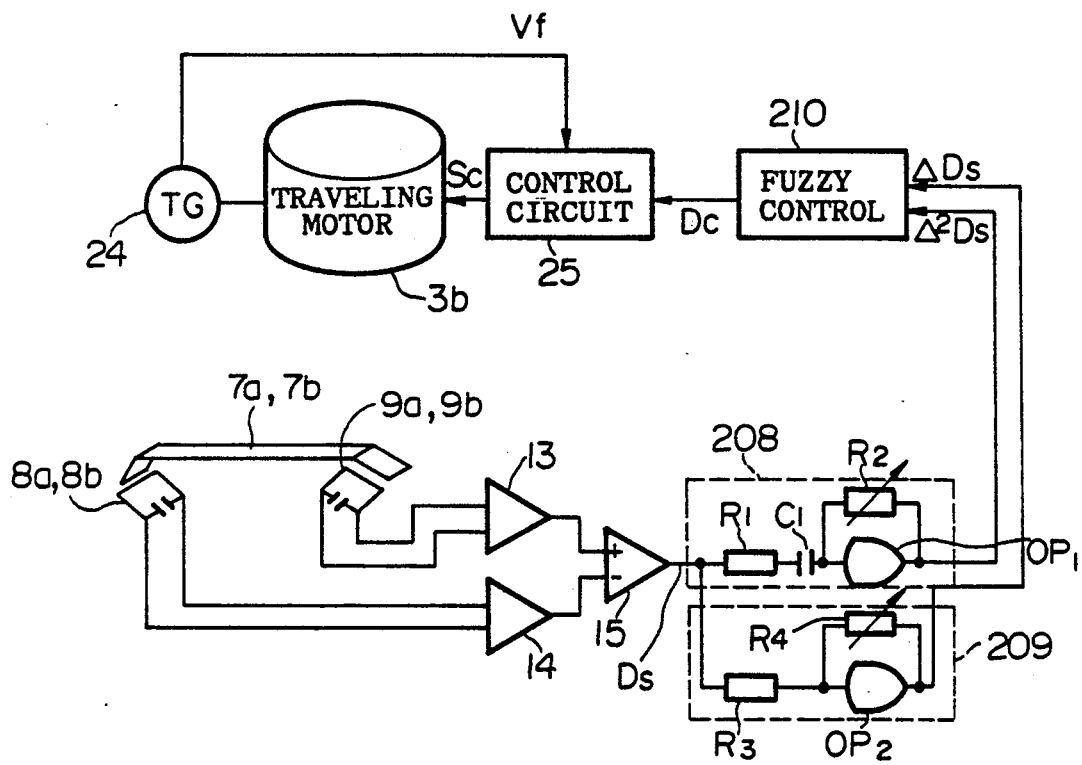
FIG. 25 is a block diagram showing an electric configuration of a velocity control unit for the unmanned carrier vehicle according to a second embodiment of the present invention.
FIG. 27 shows fuzzy control regulations.

In FIG. 25, the differential amplifier 15 outputs a deviation signal Ds representing a positional deviation of the "forward" steering sensor 7a in the forward travel. Herein, 208 designates a differentiation circuit consisting of an input resistor R1, a capacitor C1, an adjusting resistor R2 and an operational amplifier OP1. This differentiation circuit 208 differentiates the deviation signal Ds to thereby output a differentiated signal $\Delta_s^s Ds$. On the other hand, 209 designates a proportional circuit consisting of an input resistor R3, an adjusting resistor R4 and an operational amplifier OP2. This proportional circuit 209 amplifies the deviation signal Ds to the predetermined level, thereby outputting a proportional signal $\Delta Ds$. Furthermore, 210 designates a fuzzy control which performs a fuzzy control on the differentiated signal $\Delta_s^s Ds$ and proportional signal $\Delta Ds$. Then, the result of the fuzzy control is outputted from the fuzzy control 210 as a velocity control command signal Dc.

Next, description will be given with respect to the operation of the fuzzy control 210 by referring to FIGS. 26, 27.

Figure 26A:
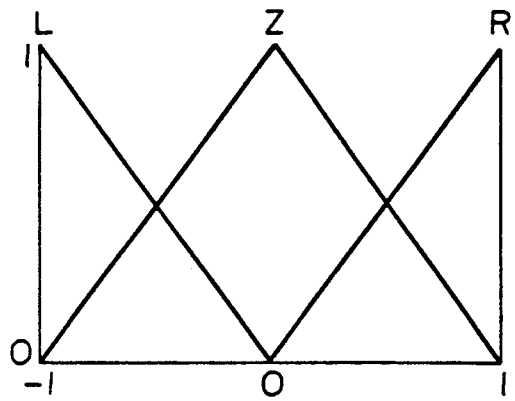
FIGS. 26A, 26B, and 26C show graphs each showing membership functions to be executed in the second embodiment.

FIG. 26 show membership functions, as described before, for use in the second embodiment. FIG. 26A shows a graph corresponding to the membership functions for the proportional signal $\Delta Ds$, wherein there are provided the membership functions which are identified by the labels L, Z, R. Herein, L designates a membership function to be executed when the forward steering sensor 7a is deviated from the guiding line in leftmost direction which is represented by that the proportional signal $\Delta Ds$ is at "$-1$". At this time, the grade (which is represented by the vertical axis of each graph) is set at "1". In addition, Z designates a membership function to be executed when the forward steering sensor 7a is positioned roughly at the center of the guiding line 11. When the sensor 7a is positioned right at the center of the guiding line 11, the corresponding grade is set at "1". When the sensor 7a is deviated from the center of the guiding line 11, the grade becomes lower. Furthermore, R designates a membership function to be executed when the forward steering sensor 7a is deviated from the guiding line 11 in rightward direction. When the sensor 7a is deviated in rightmost direction which is represented by that the proportional signal $\Delta Ds$ is at "1", the corresponding grade is set at "1".

Figure 26B:
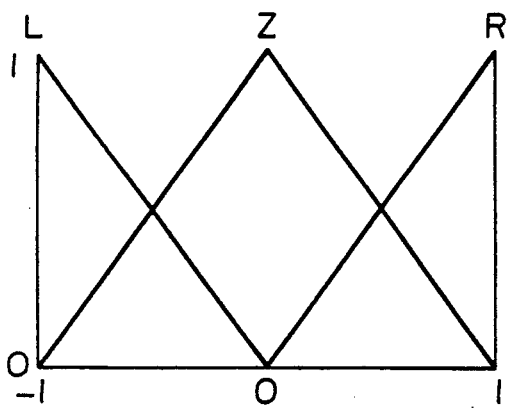

FIG. 26B shows a graph corresponding to the membership functions for the differentiated signal $\Delta_s^s Ds$, wherein the membership functions are identified by the labels L, Z, R as similar to those of FIG. 26A. Herein, L designates a membership function to be executed when the forward steering sensor 7a is deviating in leftward direction. When a deviating velocity by which the sensor 7a is deviating in leftward direction becomes the highest (which is represented by that the differentiated signal $\Delta^2 Ds$ is at "$-1$"), the membership function L has the grade at "1". In addition, Z designates a membership function to be executed when the forward steering sensor 7a is deviating at constant rate. When the deviating velocity becomes equal to zero, the grade is set at "1". Furthermore, R designates a membership function to be executed when the forward steering sensor 7a is deviating in rightward direction. When the deviating velocity by which the sensor 7a is deviating in rightward direction becomes the highest (which is represented by that the differentiated signal $\Delta^2 Ds$ is at "1"), the grade is set at "1".

Figure 26C:
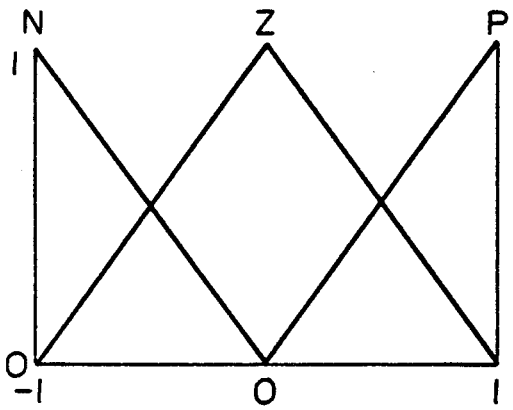

FIG. 26C shows a graph corresponding to the membership functions for the velocity control command signal Dc, each of which is obtained by the fuzzy inference. In FIG. 26C, N designates a membership function to be executed when the vehicle 1 travels at low traveling velocity; Z designates a membership function to be executed when the vehicle 1 travels at middle velocity; and P designates a membership function to be executed when the vehicle 1 travels at high traveling velocity.

Next, detailed description will be given with respect to the fuzzy inference to be performed in the fuzzy control 210. This fuzzy inference is executed in accordance with the following fuzzy control regulations.

Regulation 1: IF $\Delta Ds = L$ AND $\Delta^2 Ds = L$ THEN Dc = N
Regulation 2: IF $\Delta Ds = L$ AND $\Delta^2 Ds = Z$ THEN Dc = Z
Regulation 3: IF $\Delta Ds = L$ AND $\Delta^2 Ds = R$ THEN Dc = P
Regulation 4: IF $\Delta Ds = Z$ AND $\Delta^2 Ds = L$ THEN Dc = Z
Regulation 5: IF $\Delta Ds = Z$ AND $\Delta^2 Ds = Z$ THEN Dc = P
Regulation 6: IF $\Delta Ds = Z$ AND $\Delta^2 Ds = R$ THEN Dc = Z
Regulation 7: IF $\Delta Ds = R$ AND $\Delta^2 Ds = L$ THEN Dc = P
Regulation 8: IF $\Delta Ds = R$ AND $\Delta^2 Ds = Z$ THEN Dc = Z
Regulation 9: IF $\Delta Ds = R$ AND $\Delta^2 Ds = R$ THEN Dc = N For example, in "Regulation 1", it is regulated that when the proportional signal $\Delta Ds$ is at L (indicating the sensor is deviated in leftward direction) and differentiated signal $\Delta^2 Ds$ is at L (indicating the sensor is deviating in leftward direction), the velocity control command signal Dc is set to L (i.e., low velocity). In short, the fuzzy control regulation can be shown by a matrix as shown in FIG. 27.

Next, description will be given with respect to an actual example wherein the differentiated signal $\Delta^2 Ds$ is at "$-0.5$" and the proportional signal $\Delta Ds$ is at "0.25" which are outputted when the vehicle 1 travels along the guiding line 11 so that the forward steering sensor 7a detects the steering operation of the vehicle 1. In such example, the fuzzy control 210 performs the fuzzy inference based on these signals.

Next, detailed description will be given with respect to the operation of computing the velocity control command signal Dc based on the fuzzy inference in conjunction with the above-mentioned example. In regulation 1 as shown in FIG. 28A, the grade of the proportional signal $\Delta Ds$ is at "0" and the grade of the differentiated signal $\Delta^2 Ds$ is at "0.5". In the second embodiment, the foregoing "Method of MAX-MIN Logical Product" is employed as similar to the foregoing first embodiment. Therefore, MIN of the grades is equal to "0". Thus, regulation 1 does not conform to the present example. Similarly, the grade of the proportional signal $\Delta Ds$ is at "0" in regulations 2, 3, therefore, which do not conform to the present example. In regulation 4 as shown in FIG. 28B, the grade of the proportional signal $\Delta Ds$ is at "0.75" and the grade of the differentiated signal $\Delta^2 Ds$ is at "0.5". Therefore, MIN of them is "0.5". Accordingly, the height of the membership function Z for the velocity control command signal Dc is limited to "0.5", thus obtaining a trapezoidal waveform as shown in the rightmost graph shown in FIG. 28B. Similarly, in regulation 5, the height of the membership function P is limited to "0.5", thus obtaining a waveform as shown in the rightmost graph of FIG. 28C. Similar matching operation is made to the other regulations 6 to 9. In short, regulations 6, 9 do not conform to the present example, while it is possible to obtain waveforms as shown in the rightmost graphs of FIGS. 28D, 28E respectively in regulations 7, 8.

Figure 29:
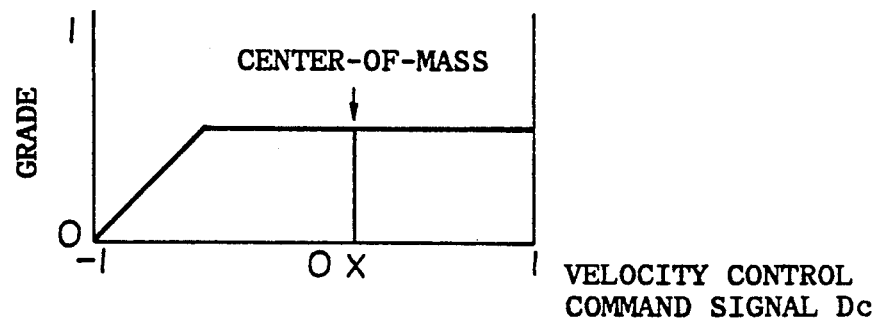

By use of the results of the above-mentioned operations to be performed on the regulations respectively, MAX-combination (wherein maximum values are combined together to form one waveform) is carried out on the above-mentioned waveforms, thereby obtaining a graph as shown in FIG. 29. Then, the output of the overall inference result is defined by the so-called "defuzzification" corresponding to the foregoing method of center-of-mass. In the present example, the center-of-mass corresponds to a position X at which the area of the figure surrounded by the line of the membership function and horizontal axis line in FIG. 29 is halved. This position X corresponds to the velocity control command signal Dc. Then, the velocity control command signal Dc as defined above is supplied to the control circuit 25. In response to this signal Dc and velocity feedback signal Vf, the control circuit 25 controls the velocity command signal Sc which is used to control the number of revolutions of the traveling motor 3b. As a result, the smooth velocity control which is similar to that performed by the person can be automatically performed on the unmanned carrier vehicle 1.

In the second embodiment, there is described a velocity control method how to control the velocity of the vehicle 1 in the forward travel. Of course, it is possible to employ such method in the backward travel.

Figure 30:
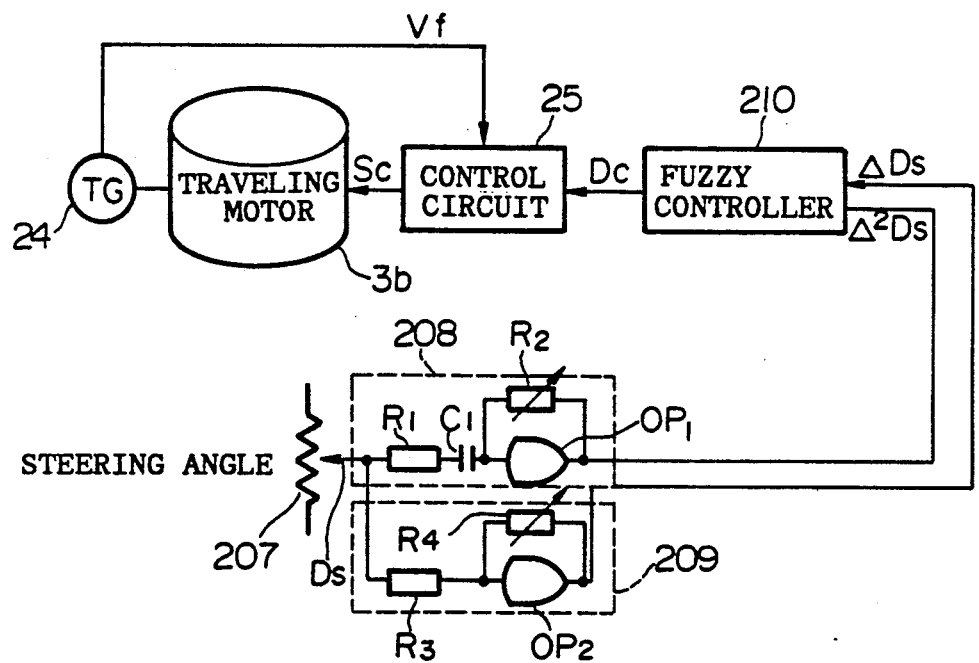
FIG. 30 is a modified example of the second embodiment.

Incidentally, it is possible to modify the configuration of the second embodiment shown in FIG. 25 to that as shown in FIG. 30. In FIG. 30, a potentiometer 207 is employed. This potentiometer 207, which can be configured by the magnetic resistor element and the like, is attached to a rotation shaft (or a steering shaft) of the steering motor 3a, thereby outputting the signal Ds as the steering angle signal corresponding to the steering operation of the vehicle 1. Herein, the steering angle signal Ds is set at "0" when the vehicle 1 travels straight. In addition, the steering angle Ds turns to negative or positive when the vehicle 1 is steered in leftward or rightward direction.

[C] THIRD EMBODIMENT

Next, description will be given with respect to a control system of the unmanned carrier vehicle according to a third embodiment of the present invention by referring to FIGS. 31 to 40, wherein parts identical to those shown in the foregoing drawings are designated by the same numerals, hence, detailed description thereof will be omitted.

Figure 31:
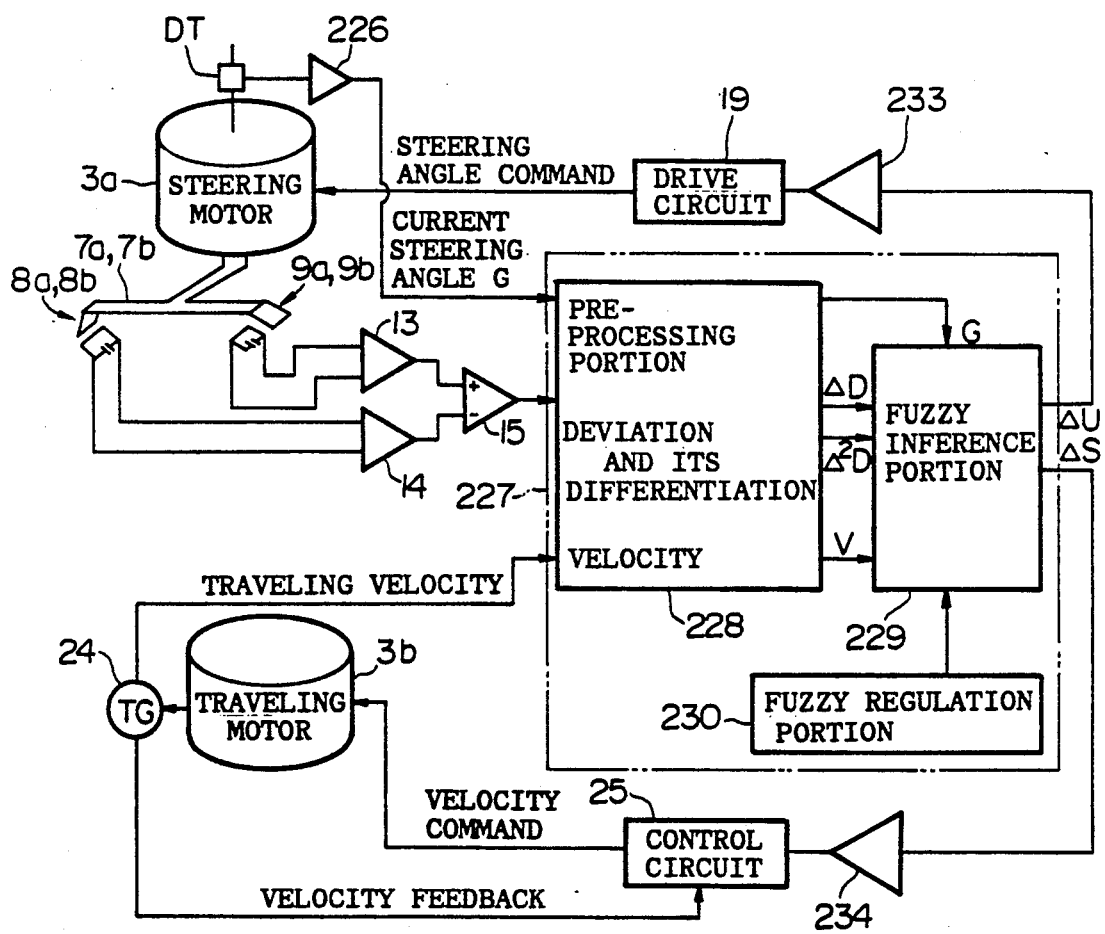
FIG. 31 is a block diagram showing an electric configuration of a velocity control unit for the unmanned carrier vehicle according to a third embodiment of the present invention.

In FIG. 31, the output of the steering angle detector DT, representing the detected steering angle, is amplified by an amplifier 226 and then supplied to a fuzzy control unit 227. The fuzzy control unit 227 contains a pre-processing portion 228, a fuzzy inference portion 229 and a fuzzy regulation portion 230. Based on the output of the differential amplifier 15, the pre-processing portion 228 computes the deviation signal $\Delta D$ and its time-differentiated signal $\Delta^2 D$, which are supplied to the fuzzy inference portion 229. In addition, the pre-processing portion 228 directly outputs the output signals of the detector DT and velocity generator 24, respectively representing the current steering angle G and current traveling velocity V.

Based on the deviation signal $\Delta D$, its time-differentiated signal $\Delta^2 D$, current steering angle G and current traveling velocity V, the fuzzy inference portion 229 performs the fuzzy inference in accordance with the fuzzy regulation, thereby computing a steering angle control $\Delta$ and a velocity control $\Delta S$. In this case, the fuzzy regulation is made by a personal computer and the like in the following formula, which is stored in the fuzzy inference portion 129, for example.

IF $\Delta D = L$ and $\Delta^2 D = L$ and $G = L$ and $V = PS$ then $\Delta U = PB$ $\Delta S = NS$ Herein, according to the above formula, when the deviation is made in leftward direction of the guiding line 11, current steering angle indicates the leftward deviation and the current traveling velocity is set relatively high, this formula instructs the vehicle 1 to reduce the traveling velocity a little.

In the third embodiment, FIG. 32 shows a membership function of the deviation signal $\Delta D$, FIG. 33 shows a membership function of the time-differentiated signal $\Delta^2 D$, FIG. 34 shows a membership function of the current steering angle G, FIG. 35 shows a membership function of the steering angle control command, FIG. 36 shows a membership function of the current traveling velocity, and FIG. 37 shows a membership function of the velocity control command.

Next, detailed description will be given with respect to each membership function as follows:

① Membership Function of Deviation Signal $\Delta$
 L: deviating in leftward direction of the guiding line 11
 Z: positioned roughly at the center of the guiding line 11
 R: deviating in rightward direction of the guiding line 11

② Membership Function of Time-Differentiated Signal $\Delta^2 D$
 L: deviating in leftward direction
 Z: deviating at constant rate
 R: deviating in rightward direction ③ Membership Function of Current Steering Angle G
 L: steered in leftward direction
 Z: not steered
 R: steered in rightward direction ④ Membership Function of Steering Angle Control Command
 NB: steered largely in leftward direction
 NM: steered in leftward direction
 NS: steered small in leftward direction
 ZO: not steered
 PS: steered small in rightward direction
 PM: steered in rightward direction
 PB: steered largely in rightward direction ⑤ Membership Function of Current Traveling Velocity V
 PB: very high velocity
 PL: moderate velocity
 PS: low velocity
 ZO: almost zero velocity ⑥ Membership Function of Velocity Control Command
 PS: raise velocity small
 ZO: maintain velocity
 NS: reduce velocity small Meanwhile, FIG. 38 shows fuzzy control regulations with respect to the current steering angle $G = L$, FIG. 39 shows fuzzy control regulations with respect to the current steering angle $G = Z$, and FIG. 40 shows fuzzy control regulations with respect to the current steering angle $G = R$. In FIGS. 38 to 40, vertical column represents the deviation signal $\Delta D$ and its time-differentiated signal $\Delta^2 D$, while horizontal column represents the current traveling velocity V. In each table, there are provided thirty-six fuzzy control regulations. For example, in the table shown in FIG. 38 with respect to $G = L$, regulation 1 corresponds to the condition "L, L, ZO", wherein the steering angle control $\Delta U$ and velocity control $\Delta S$ are set as $\Delta U =$ "PB", $\Delta S =$ "—". Herein, "—" represents that the previous value is also set as the current value as it is. In regulation 2 corresponding to "L, L, PS", these controls are set as $\Delta U = PB$, $\Delta S = NS$. In regulation 3 corresponding to "L, L, PM", these controls are set as $\Delta U = PB$, $\Delta S = NS$. In regulation 4 corresponding to "L, L, PB", these controls are set as $\Delta U = PB$, $\Delta S = NS$. Similarly, these controls are set in each regulation as shown in FIGS. 38 to 40.

As similar to the foregoing embodiments, the third embodiment employs "Method of MAX-MIN Logical Product" as the fuzzy inference method, and it also employs "Method of Center-of-Mass" as the output defining method, by which the steering angle control $\Delta U$ and velocity control $\Delta S$ are computed.

The fuzzy inference portion 129 evaluates the deviation signal $\Delta D$, its time-differentiated signal $\Delta^2 D$ and current velocity V in accordance with the fuzzy control regulation with respect to the current steering angle G (where $G = L, Z, R$), thereby computing the steering angle control $\Delta U$ and velocity control $\Delta S$. The steering angle control $\Delta U$ is amplified by an amplifier 233 and then supplied to the drive circuit 19. Thus, the steering angle motor 3a is controlled to set the desirable steering angle. On the other hand, the velocity control $\Delta S$ is amplified by an amplifier 234 and then supplied to the control circuit 25. Thus, the traveling motor 3b is controlled to set the desirable traveling velocity.

Lastly, this invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. In a steering angle control unit for an unmanned carrier vehicle capable of automatically traveling along a guiding line laid on a floor by itself, said steering angle control unit comprising:

detection means for detecting a deviation of said unmanned carrier vehicle to be deviated from said guiding line, thereby outputting a deviation signal;

computation means for performing a time-differentiation on said deviation signal to thereby compute a deviation direction of said unmanned carrier vehicle;

steering angle detecting means for detecting a steering angle of a wheel of said unmanned carrier vehicle; and control means for performing a fuzzy inference on said deviation, said deviation direction and said steering angle at a current timing, thereby controlling said steering angle of the wheel of said unmanned carrier vehicle based on a result of the fuzzy inference.

2. In a velocity control unit for an unmanned carrier vehicle capable of automatically traveling along a guiding line laid on a floor by itself, said velocity control unit comprising:

control signal generating means for generating a first control signal which value is proportional to a positional deviation of said unmanned carrier vehicle to be deviated from said guiding line, and also generating a second control signal which is obtained by performing a time-differentiation on said positional deviation; and control means, responsive to said first and second control signals, for performing a fuzzy inference on a fuzzy set defined by a plurality of membership functions in accordance with a predetermined fuzzy control regulation, thereby controlling a traveling velocity of said unmanned carrier vehicle based on a result of the fuzzy inference.

3. In a velocity control unit for an unmanned carrier vehicle capable of automatically traveling along a guiding line laid on a floor by itself, said velocity control unit comprising:

control signal generating means for generating a first control signal which value is proportional to a steering angle by which said unmanned carrier vehicle is steered along the guiding line, and also generating a second control signal which is obtained by performing a time-differentiation on the steering angle; and control means, responsive to said first and second control signals, for performing a fuzzy inference on a fuzzy set defined by a plurality of membership functions in accordance with a predetermined fuzzy control regulation, thereby controlling a traveling velocity of said unmanned carrier vehicle based on a result of the fuzzy inference.

4. In a control unit for an unmanned carrier vehicle capable of automatically traveling along a guiding line laid on a floor by itself, said control unit comprising:

detection means for detecting a deviation of said unmanned carrier vehicle to be deviated from said guiding line, thereby outputting a deviation signal;

computation means for performing a time-differentiation on said deviation signal to thereby compute a deviation direction of said unmanned carrier vehicle;

steering angle detecting means for detecting a steering angle of a wheel of said unmanned carrier vehicle;

traveling velocity detecting means for detecting a traveling velocity of said unmanned carrier vehicle; and control means for performing a fuzzy inference on said deviation, said deviation direction and said steering angle at a current timing, thereby controlling said steering angle and said traveling velocity based on a result of the fuzzy inference.

* * * * *